(12) United States Patent
Andreaco et al.

(10) Patent No.: US 9,664,800 B2
(45) Date of Patent: May 30, 2017

(54) LASER ETCHED SCINTILLATION DETECTOR BLOCKS WITH INTERNALLY CREATED REFLECTORS

(71) Applicants: Siemens Medical Solutions USA, Inc., Malvern, PA (US); University of Tennessee Research Foundation, Knoxville, TN (US)

(72) Inventors: Mark S. Andreaco, Knoxville, TN (US); Peter Carl Cohen, Knoxville, TN (US); Matthias J. Schmand, Lenoir City, TN (US); James L. Corbeil, Knoxville, TN (US); Alexander Andrew Carey, Lenoir City, TN (US); Robert A. Mintzer, Knoxville, TN (US); Charles L. Melcher, Oak Ridge, TN (US); Merry A. Koschan, Knoxville, TN (US)

(73) Assignees: University of Tennessee Research Foundation, Knoxville, TN (US); Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/048,161

(22) Filed: Feb. 19, 2016

(65) Prior Publication Data
US 2016/0170043 A1     Jun. 16, 2016

Related U.S. Application Data

(63) Continuation-in-part of application No. 14/340,182, filed on Jul. 24, 2014, now Pat. No. 9,335,426.

(60) Provisional application No. 62/152,080, filed on Apr. 24, 2015, provisional application No. 61/860,449, filed on Jul. 31, 2013.

(51) Int. Cl.
*F27D 7/06*     (2006.01)
*G01T 1/20*     (2006.01)

(52) U.S. Cl.
CPC .................................. *G01T 1/2002* (2013.01)

(58) Field of Classification Search
CPC ............ G01T 1/20; G01T 1/2002; F27D 7/06
See application file for complete search history.

(56) References Cited

U.S. PATENT DOCUMENTS

| 7,591,894 B2 | 9/2009 | Becker et al. |
| 9,057,790 B2 * | 6/2015 | Perna ..................... G01T 1/2006 |
| 2005/0104000 A1 * | 5/2005 | Kindem ................ G01T 1/1644 250/361 R |
| 2010/0090111 A1 | 4/2010 | Stroller et al. |
| 2014/0064446 A1 | 3/2014 | Wear et al. |

* cited by examiner

*Primary Examiner* — David Porta
*Assistant Examiner* — Faye Boosalis

(57) ABSTRACT

A scintillator element is disclosed where the scintillator element includes a scintillator formed of a scintillation material capable of converting non-visible radiation into scintillation light, wherein the scintillator has a plurality of laser-etched micro-voids within the scintillator, each micro-void having an interior surface, and an intrinsic reflective layer is formed on the interior surface of at least some of the micro-voids, wherein the intrinsic reflective layer is formed from the scintillation material.

21 Claims, 5 Drawing Sheets

LASER ETCHED SCINTILLATION DETECTOR BLOCKS WITH INTERNALLY CREATED REFLECTORS

CROSS-REFERENCE TO RELATED APPLICATION

This application is a continuation-in-part of U.S. patent application Ser. No. 14/340,182, filed Jul. 24, 2014, which claims the benefit of U.S. Provisional application Ser. No. 61/860,449, filed Jul. 31, 2013, the disclosures of which are incorporated herein by reference in their entirety. This application also claims priority under 35 U.S.C. §119(e) from co-pending U.S. Provisional Application Ser. No. 62/152,080, filed Apr. 24, 2015, the disclosure of which is incorporated herein by reference in its entirety.

FIELD

The present disclosure relates generally to scintillation detectors.

BACKGROUND

Scintillation materials are scientifically and economically significant in conjunction with photodetectors to detect high-energy photons, electrons, and other particles in various applications, which includes medical imaging, geological exploration, homeland security, and high-energy physics. In radiation detectors/imaging devices, scintillation material (or scintillators) may include, for example, cerium-doped scintillators. Scintillators used in this way are typically in the form of single crystals or ceramics. A detector assembly may contain an array of many smaller scintillator elements. In order to maximize the scintillation light that reaches the photodetector and to prevent that scintillation light from leaking from each scintillator element to adjacent ones, scintillator elements may be coated with a thin layer of non-transparent material with good optical reflectivity.

The externally coated reflector layer, which may be referred to as an "extrinsic reflector," may not bond well to the scintillator elements and may be undesirably thick, increasing the overall detector size. Also, the manufacturing process of applying the extrinsic reflector is an extra step and therefore introduces an additional cost in constructing a detector that includes pixelized scintillators.

Thus, there is a continual need for a simpler way to produce a reflector for scintillators.

SUMMARY

According to an aspect of the present disclosure, a radiation detector is disclosed. The radiation detector comprises: a scintillator formed of a scintillation material capable of converting non-visible radiation into scintillation light, wherein the scintillator has a plurality of laser-etched micro-voids within the scintillator, each micro-void having an interior surface; an intrinsic reflective layer formed on the interior surface of at least some of the micro-voids, wherein the intrinsic reflective layer is formed from the scintillation material; and one or more optical sensors positioned in proximity to the scintillator, to detect the scintillation light from the scintillator.

According to some embodiments, a scintillator element is disclosed where the scintillator element includes a scintillator formed of a scintillation material capable of converting non-visible radiation into scintillation light, wherein the scintillator has a plurality of laser-etched micro-voids within the scintillator, each micro-void having an interior surface, and an intrinsic reflective layer is formed on the interior surface of at least some of the micro-voids, wherein the intrinsic reflective layer is formed from the scintillation material.

BRIEF DESCRIPTION OF THE DRAWINGS

All drawing figures are schematic and are not necessarily to scale.

DETAILED DESCRIPTION

This description of the exemplary embodiments is intended to be read in connection with the accompanying drawings, which are to be considered part of the entire written description.

Figure 1:
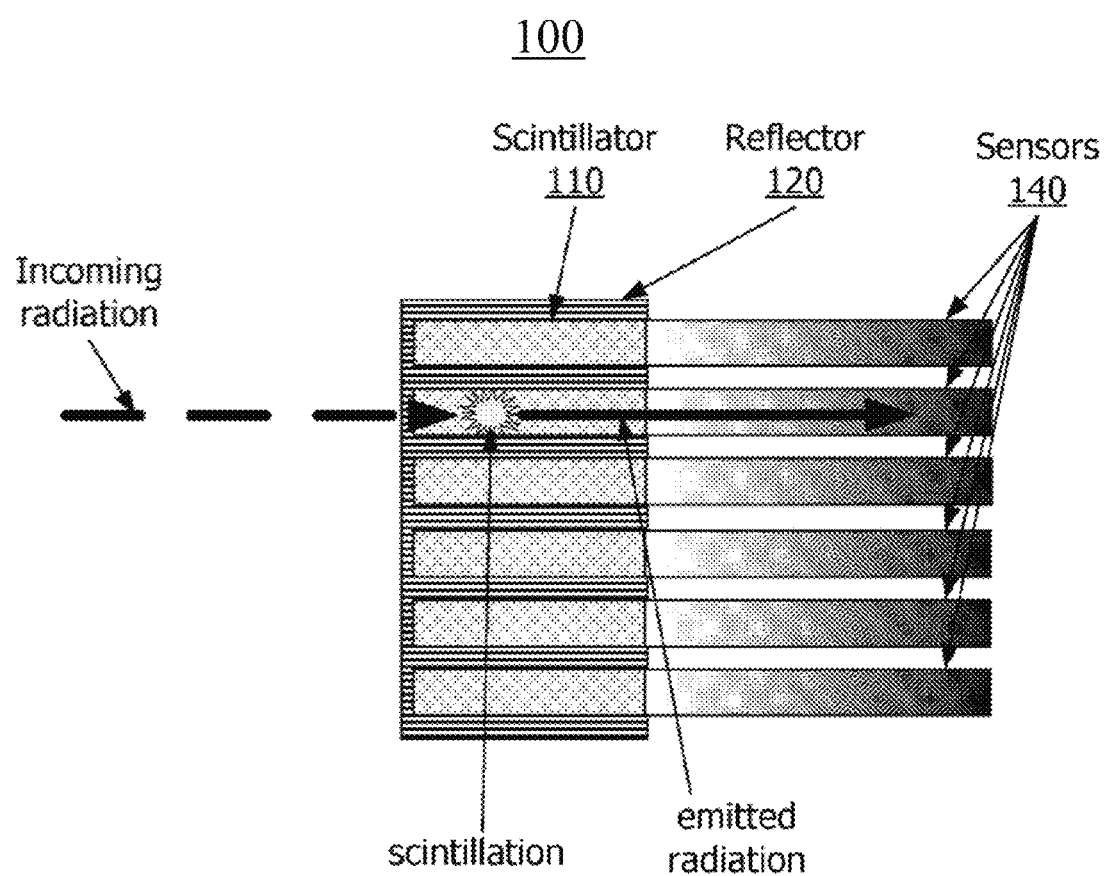
FIG. 1 illustrates a radiation detector according to an embodiment of the present disclosure.

FIG. 1 illustrates a radiation detector 100 according to an embodiment of the invention. According to an embodiment, the radiation detector 100 may include a scintillator 110, a reflector 120, and a sensor 140. The radiation detector 100 shown in FIG. 1 comprises several scintillators 110.

The scintillator 110 may include various scintillation materials capable of converting non-visible radiation (incoming radiation) into scintillation light (emitted radiation) with a spectrum detectable by the sensor 140. The sensor 140 may be placed adjacent or in close proximity to the scintillator 110, such that any converted scintillation light may be detected or measured by the sensor 140. The reflector 120 may include a layer of intrinsic reflective material formed from material of the scintillator 110, to reflect scintillation light and/or guide the scintillation light toward the sensor 140. FIG. 1 illustrates several scintillator elements 110, each isolated from other scintillator elements by the reflector 120 and each individual scintillator element 110 being associated with one optical sensor 140, other configurations may be possible, such as multiple scintillator elements being associated with each sensor 140.

The scintillator 110 may include a material that, when interacting with ionizing radiation, has a measurable response that may ultimately be used to produce an image or to detect radiation. In some embodiments, the material is a scintillation material that produces photons of light when excited by the incoming radiation. The radiation sensor 100 may include a plurality of scintillator elements each having a scintillator 110. The plurality of scintillator elements may be arranged or positioned in an array or grid pattern, with each scintillator element forming a pixel of the radiation sensor 100. The plurality of scintillator elements may be separated from each other by layers of the reflector 120, to prevent scintillation light from leaking from one scintillator element to the other scintillator elements, and to reflect scintillation light and/or guide the scintillation light toward the sensor 140.

In some embodiments, a radiation sensor 100 may be suitable for use in a variety of radiation detection applications including medical imaging applications such as positron emission tomography (PET), time-of-flight positron emission tomography (TOF-PET), X-ray computed tomography (X-ray CT) or single-photon emission computed tomography (SPECT), and any other multimodality systems (PET-CT, PET-MRI, PETSPECT).

In an embodiment, the scintillator 110 may be garnet-type scintillators, such as gadolinium gallium garnet crystals, for example doped with cerium (Ce) (generally referred to as GGAG:Ce or GAGG:Ce scintillators). In some embodiments, the presently disclosed subject matter incorporates gadolinium gallium garnet crystals or ceramics into the radiation sensor 100 as the scintillation material. However, other material may also be used. Scintillating material compositions may include, but are not limited to, $Gd_3Ga_3Al_2O_{12}$, $Gd_3Ga_2Al_3O_{12}$, $Gd3Gb_1Al_4O_{12}$, and other variants. These scintillators may be doped with an activator/dopant, such as cerium or praseodymium, with or without one or more co-dopants.

The sensor 140 may be a photomultiplier tube (PMT), photo-diode, or photo-transistor, or any other types of optical sensors. The measured quantity of light at the sensor 140 may be referred to as "light yield" or "light output," and is usually reported either as relative to a known standard or in absolute numbers as photons per MeV.

The reflector 120 may enclose around the scintillator 110 (or each scintillator element) on all surfaces, except the surface facing the sensor 140. In such a configuration, scintillation light generated in the scintillator 110 may be reflected internally in the scintillator 110 and eventually guided toward the sensor 140. The reflector 120 is configured to be thin enough to not interfere significantly with any incoming high energy radiation (such as X-ray or gamma radiation), but thick enough to reflect scintillation light in a spectrum detectable by the sensor 140.

The reflector 120 may comprise $GdAlO_3$ formed from a GGAG scintillator 110, formed by for example, processing and altering the outer portion of the GGAG scintillator into a layer of $GdAlO_3$. Ideally, the compound $Gd_3Ga_2Al_3O_{12}$ of the GGAG scintillator can disproportionate according to the following reaction:

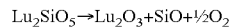

$$Gd_3Ga_2Al_3O_{12} \rightarrow 3GdAlO_3+Ga_2O+O_2$$

The gallium suboxide is volatilized and oxygen is lost. The final product is peroskovite gadolinium aluminate $GdAlO_3$. This may be referred to as an "intrinsic reflective layer," because the reflective layer material is not externally applied, but rather formed from the scintillator material itself. Alternatively, the reflector 120 may comprise other material formed from a scintillator 110. It should be further noted that while gallium-containing scintillators may form such an intrinsic reflective coating, other oxides such as $Al_2O_3$, or $SiO_2$ also have the potential to become lost due to volatilization, and therefore other inorganic oxide scintillators may also form such intrinsic reflective coating.

The reflector 120 may be formed by heating the GGAG scintillator 110 in a reducing (or oxygen-deficient) gas environment for a predetermined amount of time and temperature. For example, a cubic GGAG crystal of approximately 10 mm×10 mm×10 mm may be heated at 3.3° C./min to 1300° C. in an atmosphere of $N_2$ with 2% $H_2$ in a tube furnace and held at 1300° C. temperature and atmosphere for 5-10 hours before cooling to room temperature at the same rate. During this high temperature treatment, a stable white reflective layer of mostly $GdAlO_3$ may be formed on the surface of the GGAG crystal.

Because the intrinsic reflective coating of the reflector 120 is formed from the scintillator 110 itself, the reflector 120 is naturally bonded to the scintillator 110. No additional bonding step is required during manufacturing.

Figure 2:
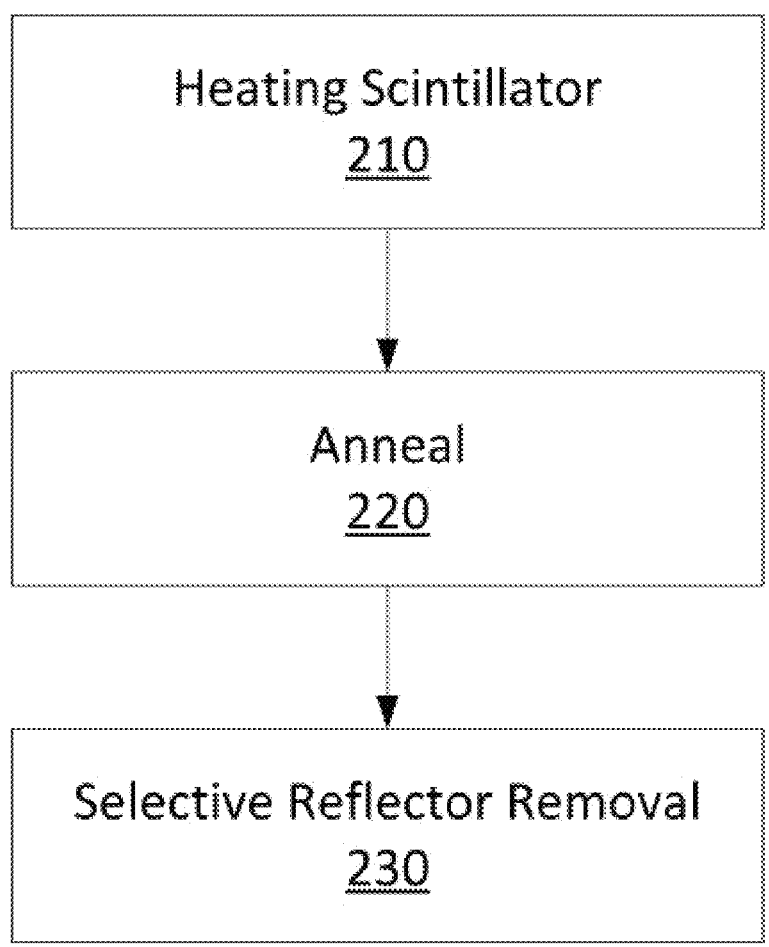
FIG. 2 illustrates an exemplary method of manufacturing intrinsic reflective layers according to an embodiment of the present disclosure.

FIG. 2 illustrates an exemplary method 200 of manufacturing according to an embodiment of the invention.

At 210, the scintillator 110 may be heat treated, for example, in a reductive atmosphere for a predetermined duration and temperature to produce an outer layer of intrinsic reflector 120.

At 220, in the event that heating in a reducing atmosphere has a negative impact on the number of photons of light produced by the scintillator when excited by ionizing radiation, it may be desired in an optional step to restore the scintillation performance by heating the scintillator 110 in an atmosphere containing some amount of oxygen. This could be done by either simply changing the reducing atmosphere to an oxidizing one during the same heat cycle, or by reheating the scintillator 110 in the oxidizing atmosphere after completing the reducing heat cycle.

At 230, the intrinsic reflector 120 around the scintillator 110 may be selectively removed to open windows for connecting to the optical sensor 140.

Many inorganic oxides can decompose or break down when heated in an oxygen-deficient environment. An oxygen deficient environment may include for example, atmospheres with no oxygen, atmospheres containing a reducing gas (such as $H_2$), atmospheres with some but not "enough" oxygen, as well as vacuum.

For example, when heated in an oxygen deficient atmosphere, lutetium oxyorthosilicate ($Lu_2SiO_5$) may decompose or break down into compounds, such as $SiO_2$ and a reflective material $Lu_2O_3$.

In this example at temperatures greater than 1600° C. in a vacuum, silicon dioxide, in this case present as orthosilicate, decomposes to silicon monoxide and oxygen, leaving lutetium oxide as a reflector coating:

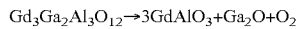

$$Lu_2SiO_5 \rightarrow Lu_2O_3+SiO+\tfrac{1}{2}O_2$$

For another example, after heat treating a $Gd_3Ga_3Al_2O_{12}$ (GGAG) crystal in a reducing atmosphere, such as nitrogen with addition of a small amount of $H_2$, for several hours (e.g. at least 1300° C. temperature for 10 hours), a white reflective surface layer of $GdAlO_3$ having good optical reflective properties will be formed. This intrinsic reflective layer is robust and firmly attached to the crystal. X-ray diffraction analysis showed that the white reflective layer is primarily composed of $GdAlO_3$. The reflectivity of this reflective layer can reach 92% and the thickness increases with the cumulative heating time in the reducing atmosphere. The white reflective layer is a product of decomposition of the GGAG surface in the reducing environment that produces gallium sesquioxide ($Ga_2O_3$) that then decomposes to the suboxide ($Ga_2O$). The suboxide of gallium may evaporate from the surface of the GGAG crystal and leave behind a white surface layer of $GdAlO_3$. Thus, the suboxides of gallium is mostly absent from the white intrinsic reflective layer. Multiple temperature/duration/oxygen-deficient atmosphere type combinations may be possible to perform the heat treatment to decompose the scintillator material to form a reflective layer.

The heat treating in a reducing atmosphere may degrade the performance of the scintillator block by reducing the scintillation light yield of the scintillator block. Without being bound by the theory, inventors believe that this degradation may occur due to degradation of the surface of the scintillator material and migration of the cerium activator towards the surface as well as creation of oxygen related defects. In order to compensate for this degradation effect of the heat treatment for forming the reflective layers, additional thermal annealing in oxygen containing atmosphere can be performed after forming the reflective layers. For example, subsequent to the heat treatment in reducing atmosphere, the additional annealing in oxygen containing atmosphere can be conducted at 1300° C. temperature or higher up to 1700° C. for at least 10 hours in air to restore the light yield. Other temperature and duration combinations may be possible to perform the annealing. Higher annealing temperature will require shorter time. The optimal combination will depend on the size of the scintillator block.

The resulting scintillator 110 may be covered by the reflector 120 on all surfaces. The reflector 120 may be selectively removed in certain portions of the outer surface of the scintillator 110 that face the optical sensor 140 to open windows for connecting to the sensor 140, for example. This may be done by various mechanical/chemical polishing techniques, or selectively masking (using for example photo resist masks) before the formation of the intrinsic reflector 120 and later removal of mask layers.

According to various heating time at 1300° C. temperature in an atmosphere of $N_2$ with 2% $H_2$, the average thicknesses of the white reflective layer produced are 313±3 μm, 484±5 μm, 724±10 μm, and 1048±38 μm, corresponding respectively to cumulative heat treatment time of 10 hr, 25 hr, 35 hr, and 50 hr. At 350 μm thick, reflectivity of the reflective layer is measured to be approximately 92% for a visible light at wavelength of 540 nm. Therefore, the reflectivity of the reflective layer can be optimized by adjusting the duration of the heat treatment.

Light yield (LY) measurements were conducted on various scintillator and reflector samples using a Hamamatsu R877 photo multiplier tube (PMT) and a 10 μCi 137Cs source; no optical couplant was used. LY value is on a scale where a bismuth germanium oxide (BGO) reference crystal is set to 100. Four crystals of approximately the same size were cut from the same boule, and an initial LY measurement was done with a hemispherical reflector to establish that all had equivalent starting LY. One sample was kept in the as-grown state (sample a); three were then subjected to heat treatment in a reducing atmosphere to form the white layer. The white layer was removed with polishing paper from all six sides of one sample (sample b), and from only one side of another sample (sample c). The sample d also had the white layer removed from all 6 sides; it was then wrapped with at least 5 layers of Teflon tape.

In these measurements below in Table 1, with the reflective dome, the measured LY indicates the total quantity of photons emitted from the sample. The performance of the intrinsic reflective layer relative to externally applied Teflon tape was evaluated by measuring the LY of the crystals without the reflective dome. In this case, the relative LY is an indicator of the relative ability of the intrinsic reflector and the Teflon tape to redirect photons into the PMT. The LY of the four crystals measured with the dome is very similar for all samples as shown in Table 1. Therefore, the LY measured without the dome can be used to indicate directly the performance of the reflective layer. As shown, the LY without the dome is very similar for samples a and b (both of which are bare GGAG crystals). This is expected since neither sample had a reflector coating to direct the photons. The LY for both samples c and d (both covered with a reflector) without the dome is greater than for samples a and b.

TABLE 1

The LY measurements of GGAG crystals under different conditions.
(The value is on a scale where the light
yield of a BGO reference crystal is set to 100.)

| Relative LY | Sample a) | Sample b) | Sample c) | Sample d) |
|---|---|---|---|---|
| with dome | 275 | 273 | 274 | 275 |
| without dome | 109 | 107 | 182-221 | 218 |

Samples:
a) As-grown GGAG
b) GGAG with intrinsic reflective layer removed
c) GGAG with reflective layer on five surfaces (values include multiple measurements with increasing cumulative soak times, see FIG. 8)
d) GGAG wrapped with Teflon tape on five surfaces According to another aspect of the present disclosure, the method for forming the intrinsic reflective layer on a scintillator block described above is applied to laser-etched scintillator blocks to produce intrinsic reflective layers within the laser generated optical structures, such as micro-voids, inside the scintillator block. By applying the method to laser-etched scintillator blocks, the intrinsic reflective layers are produced in the interior surface of at least some of the laser-etched micro-voids. Preferably, the intrinsic reflective layers are produced in as many of the laser-etched micro-voids as possible. More preferably, the intrinsic reflective layers are produced in every laser-etched micro-voids.

Figure 3:
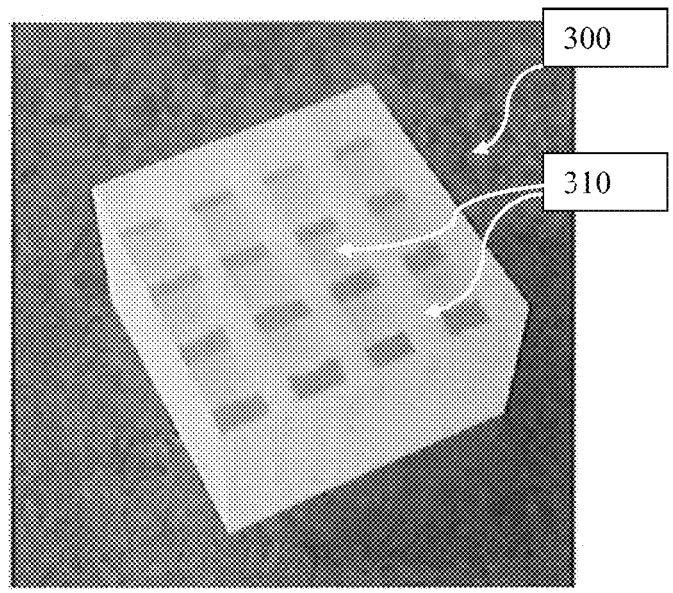
FIG. 3 is a photograph of a GAGG:Ce crystal scintillator with micro-voids produced by laser etching.

A method for fabrication of radiation detector scintillator block using laser etch technology is disclosed in U.S. Pat. No. 8,470,214, the disclosure of which is incorporated herein by reference. The laser etch method disclosed therein opened new opportunities for building low cost pixelated detectors for molecular imaging applications. The laser etch method allows one to generate optical structures within scintillator blocks by forming a large number of laser generated micro-voids within the scintillator block. These micro-voids, arranged in planes and patterns, create optical boundaries for precise control of light propagation in the scintillator block. The laser etched structures form "virtual pixels" behaving in ways similar to traditional pixels made by cutting a single crystal into multiple small pixels followed by assembly into one scintillation crystal detector array. FIG. 3 shows a photograph of an example of a GAGG:Ce crystal scintillator block 300 having a plurality of micro-voids 310 produced by laser etching within the scintillator 300.

Figure 5A:
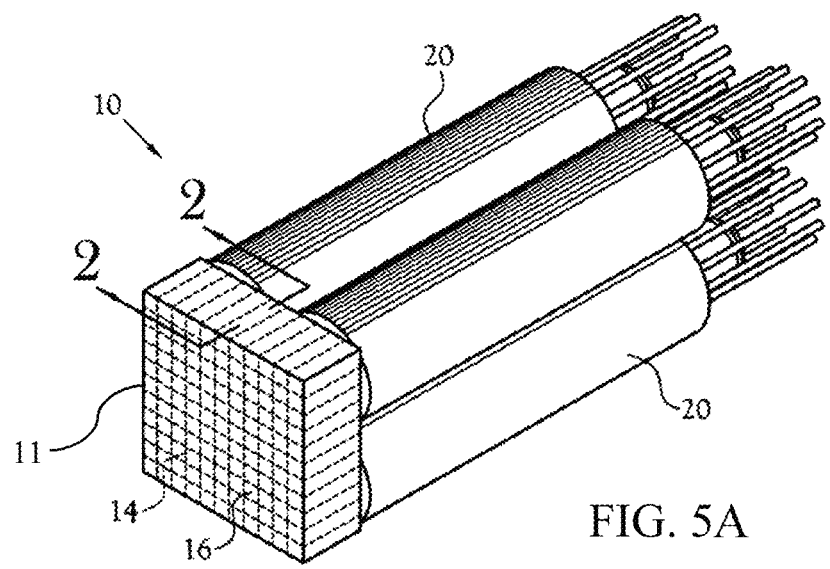
FIG. 5A is a perspective view of a radiation detector where the optical sensor used are photomultiplier tubes.

Illustrated in FIG. 5A is a perspective view of a radiation detector 10. The radiation detector 10 comprises a scintillator block 11 and optical sensor comprising an array of photomultiplier tubes (PMTs) 20. The radiation detector 10 has a plurality of micro-voids 12 (see FIG. 6) formed within the scintillator block 11 by laser etching. The micro-voids 12 collectively function to manipulate light waves to enhance the control and collection of the resultant scintillation light, allowing for the accurate decoding of the radiation impinging on the scintillator 11. The micro-voids 12 are positioned to define the optical boundaries 14 of the optically-segmented portions 16 of the scintillator 11. The configurations for the relative disposition of the micro-voids 12 are endless. For example, the micro-voids 12 may be disposed in varying sizes in a specific uniform pattern, or may be randomly placed, or may form over-sampled optically-segmented virtual resolution elements. The micro-voids 12 may be disposed in single or multiple layers, or may be randomly scattered within a given volume. The micro-voids 12 may be disposed in planar, curvilinear, or other geometrically-arranged configurations. To this extent, the optically-segmented portions 16 of the scintillator 11 may define various cross-sectional configurations other than square. For example, the optically-segmented portions 16 may define, but are not limited to, triangular, trapezoidal, or hexagonal configurations. Alternatively, the optically-segmented portions 16 may define a combination of configurations, such as octagons and squares. Further, the optically-segmented portions 16 may define varying cross-sections as they progress from one end of an optically-segmented portion 16 to the other, including transitioning from one geometric shape to another, and/or transitioning from one size to another.

Figure 5B:
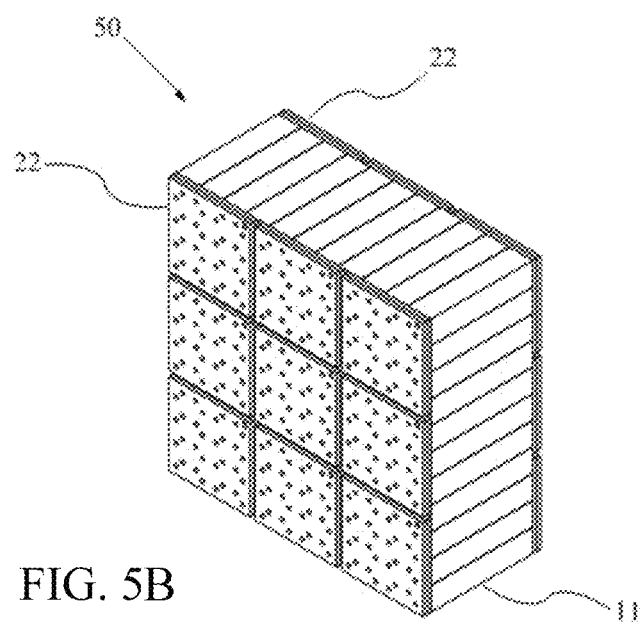
FIG. 5B is a perspective view of a radiation detector where the optical sensor used are silicon photomultipliers juxtaposed on two opposite sides of the laser etched scintillator.

In other embodiments, the optical sensor can be solid state optical sensors rather than the photomultipliers 20. Illustrated in FIG. 5B is a perspective view of a radiation detector 50 that utilizes such solid state optical sensors. The radiation detector 50 comprises a scintillator block 11 and optical sensors comprising arrays of silicon photomultipliers 22. The silicon photomultipliers 22 are disposed on two opposite sides of the scintillator 11. This configuration of optical sensors can be used to improve the spatial and/or temporal resolution of a detector by for example providing depth-of-interaction information. Additional embodiments are possible, including those with optical sensors disposed on adjacent sides of the scintillator, and those with optical sensors disposed on three or more sides of the scintillator.

In the exemplary scintillator blocks 11 shown in FIGS. 5A and 5B, the outer surfaces of the scintillator 11 would be covered with the intrinsic reflective layer formed by the thermal annealing process disclosed herein except for one or more outer surface portions that face the optical sensors.

Figure 6A:
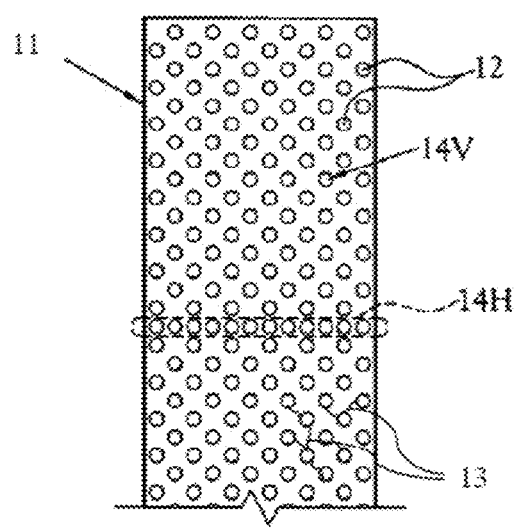
FIG. 6A illustrates a portion of the detector of FIG. 5A, shown in section taken at 2-2 in FIG. 5A.

FIG. 6A illustrates, in section, a portion of the scintillator 11 shown in FIG. 5A. Illustrated is an array of non-contiguous, independent micro-voids 12 formed by laser etching. The micro-voids 12 in this embodiment are disposed in a single layer and are arranged in a honeycomb pattern. In the view illustrated in FIG. 6A, a vertical layer 14V, representative of a vertical optical boundary, of micro-voids 12 is illustrated. Also illustrated is a single row 14H of micro-voids 12 representative of a horizontal layer. Again, while illustrated as planar layers having geometrically arranged micro-voids 12, the micro-voids 12 may alternatively be arranged in any other pattern, or configuration, or may be disposed randomly. The micro-voids 12 are also partially connected by micro-cracks 13 that are formed as a result of crack propagation and relaxation of the internal stresses in the scintillator material.

Laser etching technology provides not only a low cost method of making optical structures inside the single block of detector material, but also allows full flexibility in controlling the shape, size, and transparency of laser-generated optical boundaries inside the scintillator block. Laser etching technology can be also used for surface treatment of the scintillator materials to provide unique surface finishes suitable for achieving desirable optical surface properties. Generated voids may connect with each other when placed close enough and improve the qualities of the reflective layers. The probability of micro-voids to connect with each other is also dependent on the residual stress distribution in the scintillator material.

Figure 6B:
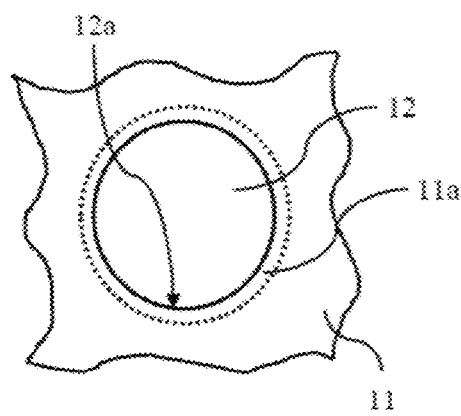
FIG. 6B illustrates a single laser-etched micro-void inside a scintillator.

FIG. 6B is an illustration of an idealized laser-etched optical structure, a single micro-void 12 for discussion. By heat treating laser-etched scintillator blocks such as the scintillator 11 in a reducing atmosphere according to the present disclosure, in addition to the intrinsic reflective layer 120 that forms on the outer surfaces of the scintillator 11, an intrinsic reflective layer 11a is formed on the interior surface 12a of the laser-etched micro-void 12 within the scintillator block 11. As mentioned above, such intrinsic reflective layer 11a is produced in at least some of the laser-etched micro-voids. Preferably, the intrinsic reflective layer 11a is produced in as many of the laser-etched micro-voids as possible. More preferably, the intrinsic reflective layer 11a is produced in every laser-etched micro-void. This allows the overall reflectivity of the scintillator block 11 to be greatly improved. The laser etched micro-voids 12 can have a diameter of about 200 µm.

In some embodiments, the method disclosed herein for forming intrinsic reflective layers applies to gallium containing scintillator materials such as the gadolinium, gallium, garnet family of materials activated with cerium, commonly known as GGAG and GYGAG, having general formula: $A_3(B,C)_5O_{12}$ doped with Ce and co-doped with one or more of B, Ba, Ca, Mg, Sr or any combination thereof, where A is selected from the group of elements: Y, La, Pr, Gd, Tb, Dy, and Lu, Sc or any combination thereof; where B is selected from the group of elements consisting of: Al, Ga, and Sc; and C is selected from the group of elements consisting of: Al and Ga, in the form of a scintillator ceramic. In some embodiments, the scintillator material can be ceramic polycrystalline material. Scintillator materials that contain gallium or silica are capable of being volatilized and thus the method of the present disclosure can be applied to form intrinsic reflective layers. Examples of ceramics other than GAGG that can utilize the method of the present disclosure include GGG ($Gd_3Ga_5O_{12}$), LSO ($Lu_2SiO_5$), YSO ($Y_2SiO_5$), and GSO ($Gd_2SiO_5$). The LSO, YSO, and GSO scintillators may also work in their pyrosilicate variant. For compounds that are co-doped with divalent cations e.g. Mg, Ca, Sr, Ba, we believe that some of the cerium exists as $Ce^{+4}$ and the addition of a divalent cation compensates for the tetravalent cerium to maintain overall stoichiometry.

Processing the laser-etched scintillator block through the intrinsic reflective layer forming heat treating method described herein produces highly reflective layers on the exterior surface of the scintillator block as well as on the interior surfaces inside the laser-etched micro-voids and micro cracks that were created as a result of the laser etching. The intrinsic reflective layers may be depleted in gallium such as, but not limited to, gadolinium perovskite phases ($GdAlO_3$). The reflectivity of the reflective layers can exceed 90% of reflectivity of five layers of Teflon tapes commonly used as a reflector.

When applied to the laser-etched scintillator blocks, the heat treatment method relies on diffusion of the reducing gas (or oxygen-deficient gas) at the elevated temperature through the bulk of the scintillator blocks. During the heat treatment, the reducing gas diffuses through the bulk of the scintillator block and reaches the laser-etched micro-voids as well as the micro cracks that may exist in the scintillator block caused by the laser etching. The exposed interior surfaces of the micro-voids and the micro cracks react with the gas and form the intrinsic reflective layer. As described above, the thickness of the reflective layers thus formed increases with the cumulative heat treatment time in the reducing gas environment.

According to one embodiment, a GGAG scintillation crystal block having laser-etched micro-voids within the bulk of the crystal block, wherein the micro-voids have interior surfaces, and intrinsic reflective layers on the internal surfaces of the micro-voids is disclosed. The intrinsic reflective layers in the laser-etched micro-voids within the bulk of the GGAG scintillation crystal block consist of a layer of $GdAlO_3$.

Figure 4:
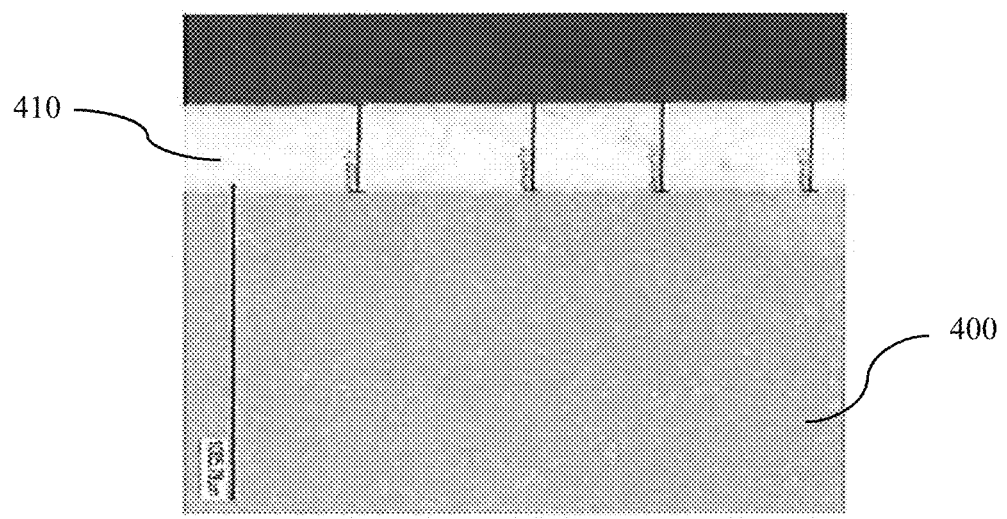
FIG. 4 is a micrograph showing a GAGG:Ce crystal scintillator that has been heat treated according to an embodiment of the present disclosure exhibiting the intrinsic reflective layer created by the heat treatment.

To form the intrinsic reflective layer of $GdAlO_3$, the GGAG scintillation crystal block is heat treated in a reducing atmosphere at a temperature, preferably at least 1300° C., for at least 10 hours. The reducing atmosphere is preferably $N_2$ gas with 2% $H_2$. A product of decomposition of the GGAG surface in the reducing environment that produces gallium sesquioxide ($Ga_2O_3$) that then decomposes to the suboxide ($Ga_2O$). The suboxide of gallium may evaporate from the surface of the GGAG crystal and leave behind a white surface layer of $GdAlO_3$. FIG. 4 shows a micrograph of a cross-section of a GAGG:Ce crystal 400 exposed to heat treatment at 1300° C. in an atmosphere of $N_2$ with 2% $H_2$ over a time of about 50 hours. The resulting intrinsic reflective layer of $GdAlO_3$ 410 is shown to be about 200 μm thick. It should be noted that the actual duration of the heat treatment necessary to achieve the desired results will depend on the size of the scintillation crystal block and the density of the micro-voids.

As previously mentioned, the heat treatment in reducing atmosphere for forming intrinsic reflective layers on scintillators can be applied to any of the scintillator materials known in the art. For example, the heat treatment can be applied to the garnet-type scintillators, such as gadolinium gallium garnet crystals, for example doped with cerium (Ce) (generally referred to as GGAG:Ce or GAGG:Ce scintillators). The heat treatment can be applied to scintillators made of the following scintillating materials, but not limited to: $Gd_3Ga_3Al_2O_{12}$, $Gd_3Ga_2Al_3O_{12}$, $Gd_3Gb_1Al_4O_{12}$, optical ceramics, composite materials, single crystals, polycrystalline materials, and other variants. These scintillators may be doped with an activator/dopant, such as cerium or praseodymium, with or without one or more co-dopants. Other oxides such as $Al_2O_3$ or $SiO_2$ also can form such intrinsic reflective layers under similar heat treatment conditions. Therefore, the heat treatments disclosed herein can also be applied to other oxide scintillators.

The laser-etched scintillators processed through the heat treatment disclosed herein will have the intrinsic reflector layer formed on the outer surfaces of the scintillator as well as the intrinsic reflector layers formed on the interior surfaces of the laser-etched micro-voids and any micro cracks that may exist in the laser-etched scintillator. Where there are micro cracks formed in the bulk of the laser-etched scintillators, the micro cracks will also exhibit intrinsic reflector layers formed on the surfaces of the micro cracks.

As discussed above generally for scintillators, the laser-etched scintillators can also exhibit degradation of scintillation performance after being exposed to the heat treatment in reducing atmosphere. The degradation in light yield can be caused by the degradation of the surface of the scintillation material, migration of the cerium activator towards the surface, as well as creation of oxygen defects during the heat treatment in reducing atmosphere. Therefore, in order to compensate or reverse this reduction in the scintillation properties of the scintillation material, according to some embodiments, additional annealing in oxygen containing atmosphere can be conducted on the laser-etched scintillator after the heat treatment in reducing atmosphere. The additional annealing can be carried out in oxygen containing atmosphere such as air at a temperature at least 1300° C., preferable at 1500° C., for at least 10 hours or longer depending on the size of the crystal block.

According to another aspect of the present disclosure, the intrinsic reflective layers created by heat treating in a reducing atmosphere, as described above, can have a very porous surface which can diminish the reflectivity of the intrinsic reflective layer. Thus, in order to improve the reflectivity, particularly for the thin reflective layers, the porous surface of the intrinsic reflective layers can be filled using chemical reagents such as tetraethyl orthosilicate (TEOS) or its close cousin TMOS (tetramethyl orthosilicate). For example, by immersing the crystal block in liquid TEOS and refluxing under an inert gas, the liquid will infiltrate the crystal block through the microcracks in the crystal block, resulting from the laser etching, via capillary action and reach the connected micro-voids and thus the intrinsic reflective layer on the interior surface of the micro-voids. Refluxing these reagents will fill any pores in the intrinsic reflective layer's porous surface. The crystal block is then exposed to air. When exposed to air, TEOS slowly hydrates to silica and alcohol. TEOS has the remarkable property of easily converting into silicon dioxide. This reaction occurs upon the addition of water:

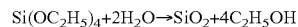

This hydrolysis reaction is an example of a sol-gel process. The side product is ethanol. The reaction proceeds via a series of condensation reactions that convert the TEOS molecule into a mineral-like solid via the formation of Si—O—Si linkages. Rates of this conversion are sensitive to the presence of acids and bases, both of which serve as catalysts. The Stöber process allows the formation of monodispersed silica particles. At elevated temperatures (>600° C.) TEOS converts into silicon dioxide:

and the volatile coproduct such as diethyl ether. The result is a creation of silica reflective material in the laser created micro-voids.

The microcracks in the crystal block mentioned above are created by the laser etching and connects most of the laser-etched micro-voids to each other and ultimately to the surface of the crystal.

In another embodiment, titanium tetrachloride ($TiCl_4$) or silicon tetrachloride ($SiCl_4$) can be used to fill any pores or voids in the intrinsic reflective layer of $GaAlO_3$. This can be accomplished by immersing the laser-etched crystal block in liquid $TiCl_4$ or $SiCl_4$ and refluxed under an inert gas as described above for TEOS and TMOS. When the crystal block is subsequently exposed to air, both $TiCl_4$ and $SiCl_4$ hydrolyze to the reflective titanium dioxide and silica dioxide, respectively, providing effective enhancement in reflectivity of the existing $GaAlO_3$ intrinsic reflective layers. Both reagents can fill microcracks and voids. This process also can be used on scintillators other than garnet types such as those varieties disclosed herein.

Another method of enhancing the reflectivity of the intrinsic reflective layer created by heat treatment in a reducing atmosphere is use of a metallic coating on the top of the intrinsic reflective layer. One of the embodiments of this invention would be the use of a few % of aluminum in gallium solid solution compound applied on the surface of the generated intrinsic reflective layer. The application of this metallic coating has to occur at temperatures above the melting point of the mixture. The melting point of the mixture can be controlled by change of aluminum concentration in relation to gallium. The metallic coating can be applied to the intrinsic reflective layer on the outer surfaces of the scintillator crystal block or the intrinsic reflective layer on the interior surfaces of the laser-etched micro-voids.

Another embodiment of this invention is to use the "silver mirror" (Tollen's Reagent). Application of this compound on the surface of the intrinsic reflective layer will improve its reflectivity for all scintillators in general. Tollen's reagent can be applied to the intrinsic reflective layer on the outer surfaces of the scintillator crystal block or the intrinsic reflective layer on the interior surfaces of the laser-etched micro-voids. There are other numerous physical and chemical techniques for forming a metallic film coating that are well known to those in the art that can be applied to form the metallic coating on the top of the intrinsic reflective layer. Many are based on vaporizing a metal source and allowing it to condense on a colder substrate, in this case the scintillator crystal. Other chemical and/or electrolytic reactions are also well known to those in the art that can be used to create the reflective metal films on top of the instrinsic reflective layer. Films of any metals including copper and gold can be formed on top of the intrinsic reflective layer using these well known techniques.

Additional enhancement of the intrinsic reflective layer would be the use of Enhanced Specular Reflector (ESR) composite material manufactured exclusively by 3M Corp. directly on the surface of the intrinsic reflective layer. This additional ESR reflective layer may be "air coupled", that is placed adjacent to the intrinsic reflective layer without any optical couplant, or applied to the intrinsic reflective layer with an optical adhesive. The ESR reflective layer can be applied to the intrinsic reflective layer on the outer surfaces of the scintillator crystal block.

Use of reflective paints containing, for example, TiO2, MgO or BaSO4, applied on the surface of the intrinsic reflective layers would also significantly enhance its reflectivity. The reflective paints can be applied to the intrinsic reflective layer on the outer surfaces of the scintillator crystal block or the intrinsic reflective layer on the interior surfaces of the laser-etched micro-voids.

The present disclosure is not intended to be limited to the embodiments shown herein, but is to be accorded the widest scope consistent with the principles and novel features disclosed herein. The scope of the invention is indicated by the appended claims rather than by the foregoing description, and all changes that come within the meaning and range of equivalency of the claims are therefore intended to be embraced therein.

What is claimed is:

1. A radiation detector, comprising:
    a scintillator formed of a scintillation material capable of converting non-visible radiation into scintillation light, wherein the scintillator has a plurality of laser-etched micro-voids within the scintillator, each micro-void having an interior surface;
    a reflective layer formed on the interior surface of each micro-void, wherein the reflective layer is formed from the scintillation material; and
    one or more optical sensors positioned in proximity to the scintillator, to detect the scintillation light from the scintillator.

2. The radiation detector of claim 1, further comprising an additional intrinsic reflective layer formed on outer surfaces of the scintillator, wherein the additional intrinsic reflective layer is also formed from the scintillation material.

3. The radiation detector of claim 2, wherein the additional intrinsic reflective layer covers the scintillator on all outer surfaces except one or more outer surface portions of the scintillator facing the optical sensors.

4. The radiation detector of claim 2, further comprising a layer of reflective paint applied on the intrinsic reflective layer.

5. The radiation detector of claim 2, further comprising titanium tetracholoride ($TiCl_4$) or silicon tetracholoride ($SiCl_4$) applied to the additional intrinsic reflective layer to fill any voids in the additional intrinsic reflective layer.

6. The radiation detector of claim 2, further comprising a metal film formed on the additional intrinsic reflective layer.

7. The radiation detector of claim 2, further comprising Enhanced Specular Reflector composite material directly on the surface of the additional intrinsic reflective layer.

8. The radiation detector of claim 2, wherein the scintillation material is $Gd_3Ga_3Al_2O_{12}$ and the intrinsic reflective layer and the additional intrinsic reflective layer comprise $GdAlO_3$.

9. The radiation detector of claim 1, wherein the scintillation material is a gallium containing material having a general formula $A_3(B,C)_5O_{12}$ doped with Ce and co-doped with one or more of B, Ba, Ca, Mg, Sr or any combination thereof;
    wherein A is selected from the group consisting of Y, La, Pr, Gd, Tb, Dy, Lu, Sc, and any combination thereof;
    wherein B is selected from the group consisting of Al, Ga, and Sc; and
    C is selected from the group consisting of Al and Ga.

10. The radiation detector of claim 1, wherein the scintillation material is $Gd_3Ga_3Al_2O_{12}$ and the intrinsic reflective layer comprises $GdAlO_3$.

11. The radiation detector of claim 1, wherein the scintillator further comprising:
    a plurality of micro-cracks within the scintillator, each micro-crack having two or more surfaces forming the micro-cracks; and
    additional intrinsic reflective layers formed on the two or more surfaces of each micro-crack, wherein the additional intrinsic reflective layers are formed from the scintillation material.

12. The radiation detector of claim 11, wherein the scintillation material is $Gd_3Ga_3Al_2O_{12}$ and the additional intrinsic reflective layers comprise $GdAlO_3$.

13. A scintillator element comprising:
    a scintillator formed of a scintillation material capable of converting non-visible radiation into scintillation light, wherein the scintillator has a plurality of laser-etched micro-voids within the scintillator, each micro-void having an interior surface; and
    an intrinsic reflective layer formed on the interior surface of at least some of the micro-voids, wherein the intrinsic reflective layer is formed from the scintillation material.

14. The scintillator element of claim 13, further comprising an additional intrinsic reflective layer formed on outer surfaces of the scintillator, wherein the additional intrinsic reflective layer is also formed from the scintillation material.

15. The scintillator element of claim 14, wherein the additional intrinsic reflective layer covers the scintillator on all outer surfaces except one or more outer surface portions of the scintillator facing the optical sensors.

16. The scintillator element of claim 14, further comprising a layer of reflective paint applied on the additional intrinsic reflective layer.

17. The scintillator element of claim 14, further comprising titanium tetracholoride ($TiCl_4$) or silicon tetracholoride ($SiCl_4$) applied to the additional intrinsic reflective layer to fill any voids in the additional intrinsic reflective layer.

18. The scintillator element of claim 14, further comprising a metal film formed on the additional intrinsic reflective layer.

19. The scintillator element of claim 13, wherein the scintillator further comprising:
   a plurality of micro-cracks within the scintillator, each micro-crack having two or more surfaces forming the micro-cracks; and
   additional intrinsic reflective layers formed on the two or more surfaces of each micro-crack, wherein the additional intrinsic reflective layers are formed from the scintillation material.

20. The scintillator element of claim 13, wherein the scintillation material is $Gd_3Ga_3Al_2O_{12}$ and the intrinsic reflective layer comprises $GdAlO_3$.

21. The scintillator element of claim 14, wherein the scintillation material is $Gd_3Ga_3Al_2O_{12}$ and the intrinsic reflective layer and the additional intrinsic reflective layer comprise $GdAlO_3$.

* * * * *